US009787851B2

(12) United States Patent
Puzon et al.

(10) Patent No.: US 9,787,851 B2
(45) Date of Patent: Oct. 10, 2017

(54) SYSTEM AND METHOD OF ASSOCIATING AND TRANSFERRING FINANCIALLY VALUABLE INFORMATION RECORDED AGAINST AN UNREGISTERED MOBILE PHONE NUMBER TO A NEW MOBILE PHONE NUMBER

(71) Applicant: VOXP Pte. Ltd., Singapore (SG)

(72) Inventors: John Joseph Gabriel C. Puzon, Paranaque (PH); Anna Beltran Mendiola, New York, NY (US)

(73) Assignee: VOXP PTE. LTD., Singapore (SG)

( * ) Notice: Subject to any disclaimer, the term of this patent is extended or adjusted under 35 U.S.C. 154(b) by 0 days.

(21) Appl. No.: 14/441,824

(22) PCT Filed: Nov. 8, 2013

(86) PCT No.: PCT/SG2013/000475
§ 371 (c)(1),
(2) Date: May 8, 2015

(87) PCT Pub. No.: WO2014/074068
PCT Pub. Date: May 15, 2014

(65) Prior Publication Data
US 2015/0281463 A1    Oct. 1, 2015

(30) Foreign Application Priority Data

Nov. 8, 2012  (SG) ................. 201208286-3

(51) Int. Cl.
*H04M 11/00* (2006.01)
*H04M 15/00* (2006.01)
(Continued)

(52) U.S. Cl.
CPC ............ *H04M 15/41* (2013.01); *G06Q 20/02* (2013.01); *G06Q 20/3223* (2013.01);
(Continued)

(58) Field of Classification Search
CPC ...... G06Q 20/32; H04M 15/07; H04M 15/09; H04M 15/41; H04M 15/43; H04M 15/47;
(Continued)

(56) References Cited

U.S. PATENT DOCUMENTS

2008/0119162 A1* 5/2008 Sivalingam ......... H04M 15/751
                                                              455/408
2008/0125080 A1* 5/2008 Phillips ................... H04L 12/14
                                                              455/405

(Continued)

OTHER PUBLICATIONS

International Search Report, mailing date Feb. 4, 2014 for corresponding International Application No. PCT/SG2013/000475.
(Continued)

*Primary Examiner* — Timothy Pham
(74) *Attorney, Agent, or Firm* — Intellectual Property Law Group LLP

(57) ABSTRACT

A system and method of associating and transferring financially valuable information recorded against an unregistered mobile phone number with an external identifier comprising the external identifier; an application program; at least one originating communications device having an unregistered mobile phone number assigned thereto; and at least one replacement communications device having a separate mobile phone number assigned thereto, the application program automatically obtains the external identifier and operates to direct at least one third party who holds financially valuable information recorded against at least one of the unregistered mobile phone numbers allocated to the at least one originating communications device to associate such financially valuable information with the external identifier; and where the application program directs the at least one third party to transfer the financially valuable information associated with the unregistered mobile phone number to the separate mobile phone number.

49 Claims, 9 Drawing Sheets

(51) Int. Cl.
*G06Q 20/02* (2012.01)
*G06Q 20/32* (2012.01)
*G06Q 20/38* (2012.01)
*H04M 17/02* (2006.01)
*H04M 17/00* (2006.01)

(52) U.S. Cl.
CPC ........... *G06Q 20/385* (2013.01); *H04M 15/07* (2013.01); *H04M 15/09* (2013.01); *H04M 15/43* (2013.01); *H04M 15/47* (2013.01); *H04M 15/8083* (2013.01); *H04M 17/02* (2013.01); *H04M 17/103* (2013.01)

(58) Field of Classification Search
CPC . H04M 15/8083; H04M 17/02; H04M 17/103
USPC ........................................................ 455/406
See application file for complete search history.

(56) References Cited

U.S. PATENT DOCUMENTS

| | | | |
|---|---|---|---|
| 2008/0281737 A1 | 11/2008 | Fajardo | |
| 2010/0287096 A1* | 11/2010 | Leul | G06Q 20/108 705/42 |
| 2010/0306099 A1 | 12/2010 | Hirson et al. | |
| 2011/0053555 A1 | 3/2011 | Cai et al. | |
| 2012/0005041 A1* | 1/2012 | Mehta | G06Q 30/0601 705/27.1 |
| 2012/0123834 A1* | 5/2012 | Nicolaidis | G06Q 20/28 705/14.11 |
| 2013/0060690 A1* | 3/2013 | Oskolkov | G06Q 20/42 705/43 |

OTHER PUBLICATIONS

Written Opinion of the ISA, mailing date Feb. 4, 2014 for corresponding International Application No. PCT/SG2013/000475.
Written Opinion of the IPEA, mailing date Oct. 31, 2014 for corresponding International Application No. PCT/SG2013/000475.
International Preliminary Report on Patentability dated Mar. 6, 2015 for corresponding International Application No. PCT/SG2013/000475.

* cited by examiner

SYSTEM AND METHOD OF ASSOCIATING AND TRANSFERRING FINANCIALLY VALUABLE INFORMATION RECORDED AGAINST AN UNREGISTERED MOBILE PHONE NUMBER TO A NEW MOBILE PHONE NUMBER

FIELD OF THE INVENTION

The invention relates to a method of associating financially valuable information recorded against an unregistered mobile phone number with an external identifier. A follow-on from this core invention is a subsidiary invention of thereafter facilitating the subsequent transfer of said financially valuable information to at least one new mobile phone number. In this manner, the invention(s) are particularly suited to ensure that credits or rewards earned through use of a Subscriber Identity Module ("SIM") identifiable by way of a pre-paid mobile phone number are not lost with loss of the SIM and can be transferred to a new SIM.

BACKGROUND TO THE INVENTION

The following discussion of the background to the invention is intended to facilitate an, understanding of the present invention. However, it should be appreciated that the discussion is not an acknowledgment or admission that any of the material referred to was published, known or part of the common general knowledge in any jurisdiction as at the priority date of the application.

A number of Mobile Network Operators ("MNOs") offer value added services ("VASs"). Whether run by the MNO themselves or third party service providers, these services identify their customers by way of their mobile phone numbers or, more formally, by their Mobile Identification Numbers ("MINs").

While this poses no problems for the pre-paid customer in situations where the VAS is a one-off or discrete service, for those services which offer financial rewards for volume use or use-over-time, relying on MINs for identification can be financially detrimental to the pre-paid customer if they lose the SIM to which the MIN is ascribed.

As an example, the applicant offers a VAS under the trade mark "SOS". The SOS service "lends" phone credits to a customer who sign up using their mobile phone number. A first time customer is "lent" up to three (3) text messages on sign up. This means that should the customer run out of pre-paid credits, they can still send up to three (3) text messages which are paid for or guaranteed by the SOS service provider. These "lent" credits are then deducted from the user's MNO pre-paid balance immediately or shortly following a top up payment.

Over continued use, the SOS service develops a more informed assessment of each of its customer's usage, top up behaviour and the like, ultimately leading to some measure of their credit worthiness. In line with this information, the SOS service can then offer varying and higher "credit lines" to the customer (for example, an increase in the amount of text messages that they may make once they have exhausted their pre-paid credit with the MNO). This credit assessment is of financial value to the customer.

As a pre-paid customer though, if the customer should ever lose or damage their SIM card, the customer has no way of verifying their identity with the SOS service. This means that the credit assessment associated with the lost mobile phone number is no longer available to the customer and the customer must establish a new credit assessment via a replacement mobile phone number or MIN.

While an obvious solution to this problem is to require that pre-paid customers register their names and other particulars with the MNO, and thus have the financially valuable information associated with their registered details rather than their mobile phone number or MIN, this is not always possible or convenient.

One example of this difficulty is that pre-paid mobile phones can be purchased from a range of outlets and not just from those owned or operated under license from the MNO. Thus, at the time of purchase, a large number of customers do not have access to the infrastructure or mechanisms necessary to record identifying information with the MNO. Even if such infrastructure or mechanisms are available outside of proprietary channels, the greater the amount of time that passes since purchase the less chance there is that the customer will act to record their identifying information with the MNO.

Additionally, there are always some customers that—for whatever reason—do not want their identifying information recorded with an MNO. Other customers simply do not register on the belief that their SIM will never be stolen or damaged contrary to recent evidence which shows that the most common reasons for loss of MIN are:

damage caused by repeatedly swapping SIMs into a phone; AND
  locking of the SIM following repeated failure of an authentication procedure.

It is therefore an object of the present invention to provide a system that allows financially valuable information to be transferred or shared between phone numbers, one of which being an unregistered pre-paid mobile phone number.

SUMMARY OF THE INVENTION

Throughout this document, unless otherwise indicated to the contrary, the terms "comprising", "consisting of", and the like, are to be construed as non-exhaustive, or in other words, as meaning "including, but not limited to".

Additionally, while reference is made within this specification to mobile phone numbers, that term is intended to describe not only the mobile phone number as would be readily known to a user, but also the MIN of a SIM.

In accordance with a first aspect of the invention there is a system of associating financially valuable information recorded against an unregistered mobile phone number with an external identifier comprising:

the external identifier;
  an application program; and
  at least one originating communications device having an unregistered mobile phone number assigned thereto, where, on execution of the application program, the application program automatically obtains the external identifier and operates to direct at least one third party who holds financially valuable information recorded against at least one of the unregistered mobile phone numbers allocated to the at least one originating communications device to associate such financially valuable information with the external identifier.

In its preferred embodiment, the external identifier is a user account with a social media platform. The social media platform may be one of the following: Twitter; Facebook; Google+; LinkedIn. The application program may be integrated with at least a user interface of the social media platform.

The application program may operate to show, by way of the user interface of the social media platform, details of each of the at least one originating communications device associated with the user account. Furthermore, the application program may operate to show the financially valuable information associated with each of the at least one originating communications device. To facilitate ease of recognition, the financially valuable information so displayed may be grouped according to the third party whom has generated that information.

In an alternative arrangement, the external identifier may be an e-mail address.

The application program may operate to initiate an authentication process and only directs the at least one third party who holds the financially valuable information to associate the financially valuable information with the external identifier following successful authentication. Preferably, the authentication process includes responding to the applications program within a set time period with a code sent by communications message to at least one of the at least one unregistered mobile phone numbers.

The at least one originating communications device may be a pre-paid mobile phone.

At least one of the at least one third party is preferably a value added service provider. Furthermore, the at least one third party may also be the provider of the application program.

In accordance with a second aspect of the invention there is a system for transferring the financially valuable information associated with the external identifier in accordance with the first aspect of the invention to at least one new mobile phone number comprising:
   the application program;
   the third party who holds financially valuable information recorded against a selected originating communications device from the at least one originating communications device having an unregistered mobile phone number assigned thereto; and
   at least one replacement communications device having a separate mobile phone number assigned thereto,
where the application program is operable to direct the at least one third party to transfer the financially valuable information associated with the unregistered mobile phone number assigned to the selected originating communications device to the separate mobile phone number associated with the replacement communications device.

The application program may be further operable to check if the mobile phone number assigned to the selected originating communications device is still active and, if still active, to send a message to the mobile phone number assigned to the selected originating communications device advising that a request has been made to transfer the financially valuable information to the replacement communications device. Furthermore, if the mobile phone number assigned to the selected originating communications device is still active, the application program may further operate to periodically send communication messages to the selected originating communications device advising that a request has been made to transfer the financially valuable information to the replacement communications device until the expiry of a preset time period. In such situations, the application program may only proceed to issue the direction to the at least one third party to transfer the financially valuable information if the preset time period has expired and a user who owns or is in possession of the selected originating communications device does not record an objection to the transfer with the application program. The user may record an objection to the transfer with the application program by way of a reply message to the communication messages advising that a request has been made to transfer the financially valuable information to the mobile phone number associated with the replacement communications device.

In a variant of its preferred embodiment, the application program only proceeds to issue the direction to the at least one third party to transfer the financially valuable information if the user account with the social media platform meets predetermined criteria. In such circumstances, the predetermined criteria is at least one of the following: the user account has been active within a set time frame; the user account has been in existence for at least a predetermined time period.

According to a third aspect of the invention there is a system for sharing the financially valuable information associated with the external identifier in accordance with the first aspect of the invention with at least one new mobile phone number comprising:
   the application program;
   the third party who holds financially valuable information recorded against a selected originating communications device from the at least one originating communications device having an unregistered mobile phone number assigned thereto; and
   at least one additional communications device having a separate mobile phone number assigned thereto,
where the application program is operable to direct the at least one third party to share the financially, valuable information associated with the unregistered mobile phone number assigned to the selected originating communications device with the separate mobile phone numbers associated with each of the at least one additional communications device.

Any charges applied against the at least one third party against the mobile phone number of the originating communications device, if not paid within a specified timeframe, may be applied against the separate mobile phone number of the at least one additional communications device. In this manner, the additional communications device may act as a "guarantor" for the originating communications device.

When the financially valuable information is being shared with a separate mobile phone number of the at least one additional communications device which is itself associated with separate financially valuable information, the application program may operate to combine the financially valuable information associated with both mobile phone numbers and associate the combined financially valuable with both mobile phone numbers. In the event that elements of the separate sets of financially valuable information are mutually exclusive, the application program may:
   include in the combined financially valuable information the most favourable elements of the separate sets of financially valuable information; OR
   aggregate those elements of the separate financially valuable information and include the aggregated elements in the combined financially valuable information.

In accordance with a fourth aspect of the invention there is a method of associating financially valuable information recorded against an unregistered mobile phone number with an external identifier comprising the steps of:
   automatically obtaining the external identifier; and directing at least one third party who holds financially valuable information recorded against at least one unregistered mobile phone number assigned to an originating communications device to associate such financially valuable information with the external identifier.

When the external identifier is a user account with a social media platform, the method may further comprise the step of displaying details of the originating communications device associated within the external identifier by way of the social media platform's user interface.

The method may also include the step of displaying details of the financially valuable information associated with the communications device by way of the social media platform's user interface. Furthermore, the details of the financially valuable information associated with the user account may also be displayed by way of the social media platform's user interface.

To facilitate ease of reference, the financially valuable information may be grouped for display according to the third party whom has generated that information.

An authentication process may be initiated and the step of directing at least one third party who holds financially valuable information recorded against at least one unregistered mobile phone number assigned to an originating communications device to associate such financially valuable information with the external identifier may only be performed on successful completion of the authentication process.

In accordance with a fifth aspect of the invention there is a method for transferring financially valuable information associated with an external identifier to at least one new mobile phone number comprising the steps of:
  receiving details of an unregistered mobile phone number having associated financially valuable information;
  receiving details of a separate mobile phone number; and
  directing at least one third party to transfer the financially valuable information associated with the unregistered mobile phone number to the separate mobile phone number.

The method may also include the steps of:
  checking if the unregistered mobile phone number is still active; and
  if the unregistered mobile phone number is still active, sending a message to the unregistered mobile phone number advising that a request has been made to transfer the financially valuable information to another mobile phone number.

Further messages may be sent periodically to the unregistered mobile phone number until the expiry of a preset time period.

The method may also include the steps of:
  waiting during the preset time period for an objection message from the unregistered mobile phone number; and
  only directing at least one third party to transfer the financially valuable information associated with the unregistered mobile phone number to the separate mobile phone number if an objection message is not received from the unregistered mobile phone number before the expiry of the preset time period.

The step of directing at least one third party to transfer the financially valuable information associated with the unregistered mobile phone number to the separate mobile phone number may only be undertaken if the financially valuable information is also associated with a user account with a social media platform and that user account meets predetermined criteria. Examples of such predetermined criteria include one or more of the following: the user account has been active within a set time frame; the user account has been in existence for at least a predetermined time period.

In accordance with a sixth aspect of the invention there is a method for sharing financially valuable information associated with an external identifier, as made in accordance with the method of the first aspect of the invention, with at least one new mobile phone number comprising the steps of:
  receiving details of an unregistered mobile phone number having associated financially valuable information;
  receiving details of a separate mobile phone number; and
  directing at least one third party to share the financially valuable information associated with the unregistered mobile phone number with the separate mobile phone number.

The method may further include the step of applying charges of a third party made against the unregistered mobile phone number against the separate mobile phone number if not paid within a specified timeframe.

The method may also include the step of combining the financially valuable information associated with the unregistered mobile phone number and any financially valuable information associated with the separate mobile phone number.

The method may also comprise the steps of:
  identifying the most favourable mutually exclusive financially valuable information from the financially valuable information associated with the unregistered mobile phone number and the financially valuable information associated with the separate mobile phone number; and
  where the step of combining the financially valuable information associated with the unregistered mobile phone number and any financially valuable information associated with the separate mobile phone number involves the collation of the identified most favourable mutually exclusive financial information and all non-mutually exclusive financial information associated with either the unidentified mobile phone number or the separate mobile phone number.

Alternatively, the method may further comprise the steps of:
  to the extent possible, aggregating the most favourable mutually exclusive financially valuable information from the financially valuable information associated with the unregistered mobile phone number and the financially valuable information associated with the separate mobile phone number; and
  where the step of combining the financially valuable information associated with the unregistered mobile phone number and any financially valuable information associated with the separate mobile phone number involves the collation of the aggregated most favourable mutually exclusive financial information and all non-mutually exclusive financial information associated with either the unidentified mobile phone number or the separate mobile phone number.

In accordance with a seventh aspect of the invention there is software recorded on a computer readable medium for associating financially valuable information recorded against an unregistered mobile phone number with an external identifier, such that, when executed on an appropriate processing device, the software operates to:
  automatically obtain the external identifier; and
  direct at least one third party who holds financially valuable information recorded against at least one unregistered mobile phone number assigned to an originating communications device to associate such financially valuable information with the external identifier.

When the external identifier is a user account with a social media platform, the software may further operate to display details of the originating communications device associated within the external identifier by way of the social media platform's user interface. The software may also operate to display details of the financially valuable information associated with the communications device by way of the social media platform's user interface.

The software can also operate to display details of the financially valuable information associated with the user account by way of the social media platform's user interface.

The software may group the financially valuable information according to the third party whom has generated that information.

The software may also operate to initiate an authentication process and only direct at least one third party who holds financially valuable information recorded against at least one unregistered mobile phone number assigned to an originating communications device to associate such financially valuable information with the external identifier on successful completion of the authentication process.

In accordance with an eight aspect of the invention there is software recorded on a computer readable medium for transferring financially valuable information associated with an external identifier to at least one new mobile phone number, such that, when executed on an appropriate processing device, the software operates to:
receive details of an unregistered mobile phone number having associated financially valuable information;
receive details of a separate mobile phone number; and
direct at least one third party to transfer the financially valuable information associated with the unregistered mobile phone number to the separate mobile phone number.

The software may further operate to:
check if the unregistered mobile phone number is still active; and
if the unregistered mobile phone number is still active, send a message to the unregistered mobile phone number advising that a request has been made to transfer the financially valuable information to another mobile phone number.

Further messages may be periodically sent by the software to the unregistered mobile phone number until the expiry of a preset time period.

The software may also operate to:
wait during the preset time period for an objection message from the unregistered mobile phone number; and
only direct at least one third party to transfer the financially valuable information associated with the unregistered mobile phone number to the separate mobile phone number if an objection message is not received from the unregistered mobile phone number at the expiry of the preset time period.

The software may only direct at least one third party to transfer the financially valuable information associated with the unregistered mobile phone number to the separate mobile phone number if the financially valuable information is also associated with a user account with a social media platform and that user account meets predetermined criteria. The predetermined criteria may be at least one of the following: the user account has been active within a set time frame; the user account has been in existence for at least a predetermined time period.

In accordance with a ninth aspect of the invention there is software recorded on a computer readable medium for sharing financially valuable information associated with an external identifier, such that, when executed on an appropriate processing device, the software operates to:
receive details of an unregistered mobile phone number having associated financially valuable information;
receive details of a separate mobile phone number; and
direct at least one third party to share the financially valuable information associated with the unregistered mobile phone number with the separate mobile phone number.

The software may further operate to apply charges of a third party made against the unregistered mobile phone number against the separate mobile phone number if not paid within a specified timeframe.

The software may combine the financially valuable information associated with the unregistered mobile phone number and any financially valuable information associated with the separate mobile phone number. This may be achieved by identifying the most favourable mutually exclusive financially valuable information from the financially valuable information associated with the unregistered mobile phone number and the financially valuable information associated with the separate mobile phone number and then combining the financially valuable information associated with the unregistered mobile phone number and any financially valuable information associated with the separate mobile phone number involves the collation of the identified most favourable mutually exclusive financial information and all non-mutually exclusive financial information associated with either the unidentified mobile phone number or the separate mobile phone number.

Alternatively, this may be achieved by, to the extent possible, aggregating the most favourable mutually exclusive financially valuable information from the financially valuable information associated with the unregistered mobile phone number and, the financially valuable information associated with the separate mobile phone number and then combining the financially valuable information associated with the unregistered mobile phone number and any financially valuable information associated with the separate mobile phone number involves the collation of the aggregated most favourable mutually exclusive financial information and all non-mutually exclusive financial information associated with either the unidentified mobile phone number or the separate mobile phone number.

BRIEF DESCRIPTION OF THE DRAWINGS

The invention will now be described, by way of example only, with reference to the accompanying drawings, in which.

PREFERRED EMBODIMENTS OF THE INVENTION

Figure 1:
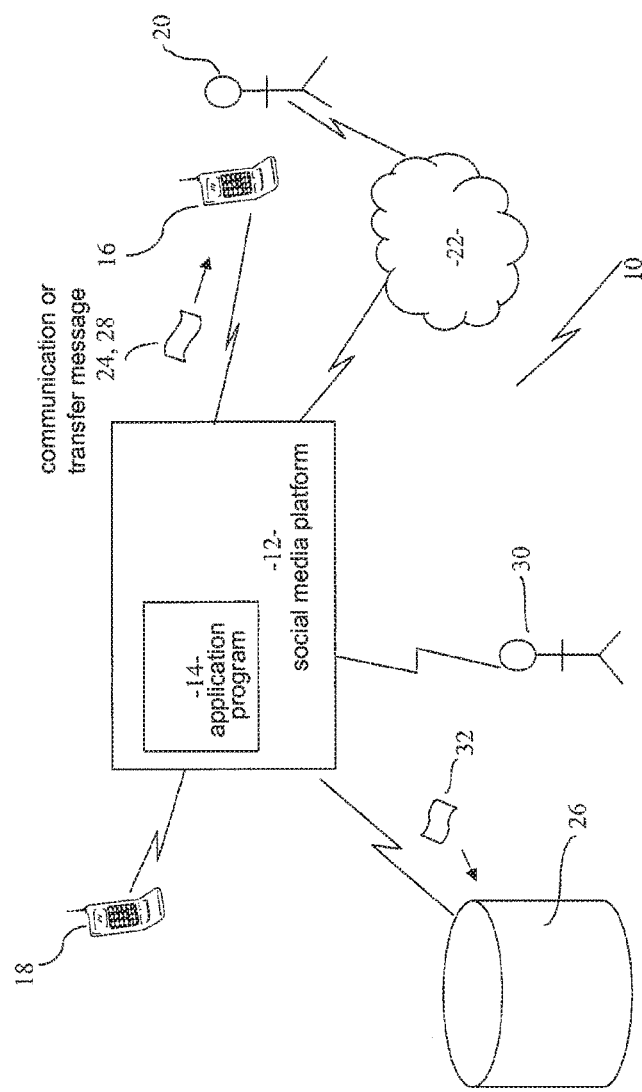
FIG. 1 is a schematic representation of a first embodiment of the invention.

In accordance with a first embodiment of the invention there is a system 10 of associating financially valuable information with at least one unregistered pre-paid mobile phone number. The system 10 comprises:
- a social media platform 12;
- an application program 14;
- a SIM 16 associated with a pre-paid mobile phone number; and
- a replacement SIM 18.

The social media platform 12 is accessible by the Internet 22. In this embodiment, the social media platform 12 requires each user 20 to provide particulars that assist in identifying the user 20, such as their legal name.

The application program 14 in this embodiment is a separate executable program adapted to work in conjunction with the social media platform 12. The application program 14 can be initiated through an icon displayed via the user interface of the social media platform 12.

The interaction of these components of the system 10 will now be described in the context of the most common use for the invention.

The user 20 downloads the application program 14 from a website 22. Example websites 22 from which the application program 14 may be downloaded include iTunes™ App Store and Google™'s Google Play™. Once downloaded, the application program 14 is executed. The user 20 then logs into their account with the social media platform 12 in the manner prescribed by the social media platform 12.

Once the user's 20 account with the social media platform 12 has been accessed the user 20 initiates the application program 14 by way of the icon displayed via the user interface. Once initiated, the application program 14 prompts the user 20 to enter a mobile phone number. At the same time, the application program 14 automatically extracts relevant details of the user's account with the social media platform 12.

The user 20 then enters in the mobile phone number associated with SIM 16.

The application program 14 then generates a time-limited confirmation code and stores the confirmation code in memory. At the same time a timer is established to countdown the time until the confirmation code expires.

The application program 14 then operates to send a communication message 24 to the SIM 16 as identified by the entered mobile phone number. The body of the communication message 24 sets out the confirmation code.

The user 20 is then prompted by the application program 14 to enter the confirmation code contained in the body of the communication message 24 sent to their SIM 16.

Once the confirmation code has been entered by the user 20, the application program 14 verifies that it is correct.

Verification comprises two checks. The first check sees the confirmation code as entered by the user 20 compared with the confirmation code as stored in memory. The second check is to see that the timer countdown has not reached 0. If both checks are passed, then the confirmation code is considered to be verified.

Following verification, any financially valuable information associated with the phone number of SIM 16 recorded by participating value added service providers 26 will then also be recorded in relation to the user's 20 social network account (as identified by the information automatically extracted by the application program 14 as described above).

At the same time, following verification, each participating value added service provider 26 sets a flag associated with the user's account to a value representing that the account is now "enabled" for identification via their social network authentication process. This means that the user 20 is in effect able to access their account with the value added service provider 26 by merely authenticating themselves through their associated social network account.

If the user 20 thereafter loses SIM 16, or has it stolen or damaged, they then initiate the application program 14 for a second time by way of the icon displayed via the user interface of the social media platform 12.

The user 20 is then asked to enter in the mobile phone number of the replacement SIM 18.

Operation of the application program 14 this second time sees the application program contact the MNO to determine whether SIM 16 is still active. If the MNO returns data indicative that this SIM 16 is active, the application program 14 will do the following:
- send an initial message to the user 20 informing them that SIM 16 remains active;
- send a first proposed transfer message 28 to SIM 16 advising of the proposed transfer and asking for a response if the transfer is not authorised. Further transfer messages will continue to be sent periodically within a defined holding period. (typically somewhere between 24 and 48 hours from the time the first proposed transfer message is sent).
- If no response is received within the defined holding period, then proceed with the transfer.
- If a response is received within the defined holding period indicating that the transfer is not authorised, refer the matter to a human operator 30 for human intervention.

In this embodiment, at the end of the defined holding period or on resolution of the matter by the human operator 30 in favour of the proposed transfer, the application program 14 sends a series of redirect requests 32 to each participating VAS provider 26. Each redirect request 32 instructs a participating VAS provider 26 to transfer details of all financially valuable information associated with the mobile phone number of SIM 16 to the mobile phone number of the replacement SIM 18. Thus, following the redirect request, the financially valuable information recorded by each participating VAS will be associated only with the social media account and the mobile phone number of the replacement SIM 18.

This process can then be repeated each time the user 20 in some way loses control of their mobile phone number (or corresponding SIM).

Figure 2:
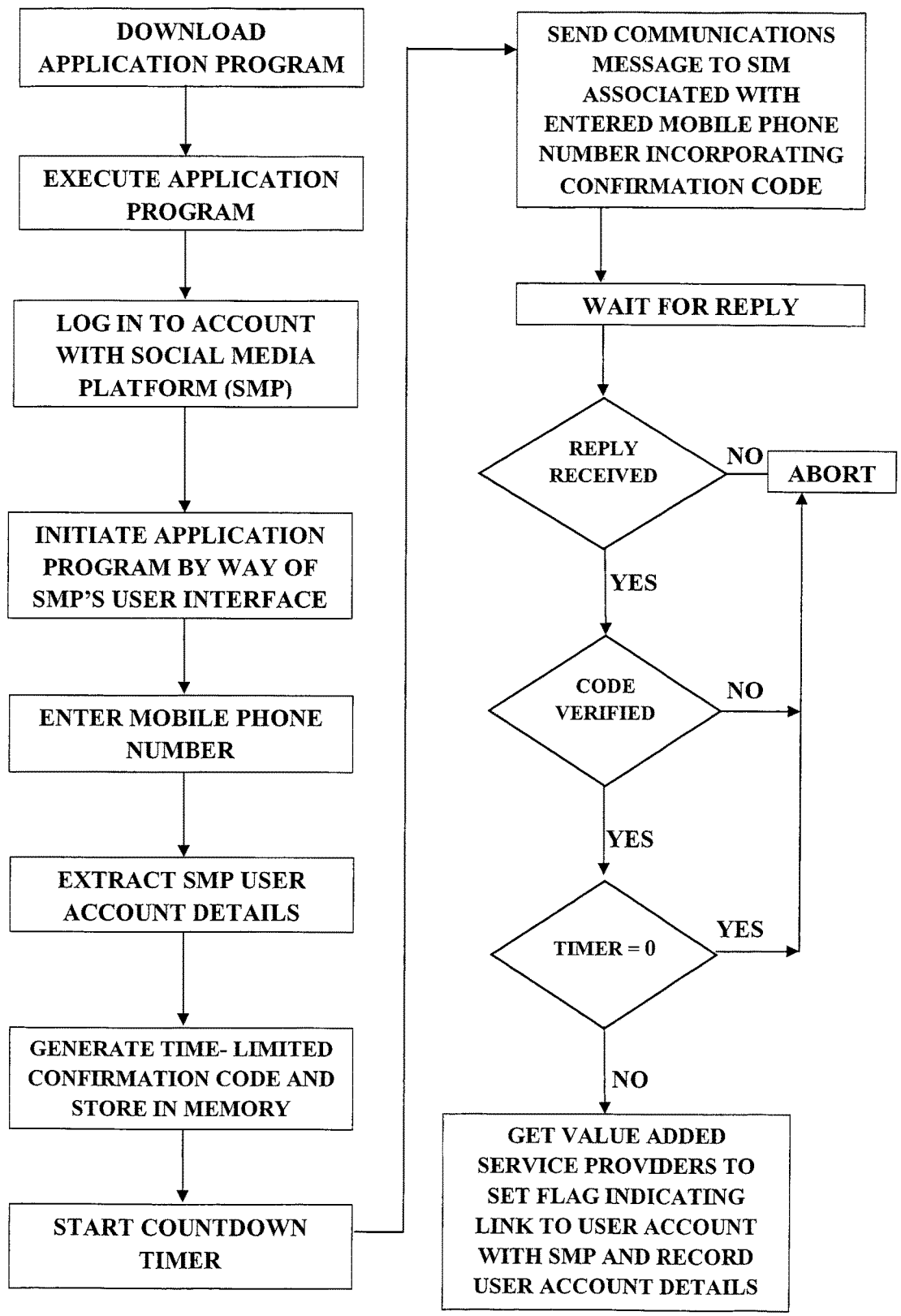
FIG. 2 is a first flowchart of one aspect of the method of the first embodiment of the invention.
Figure 3:
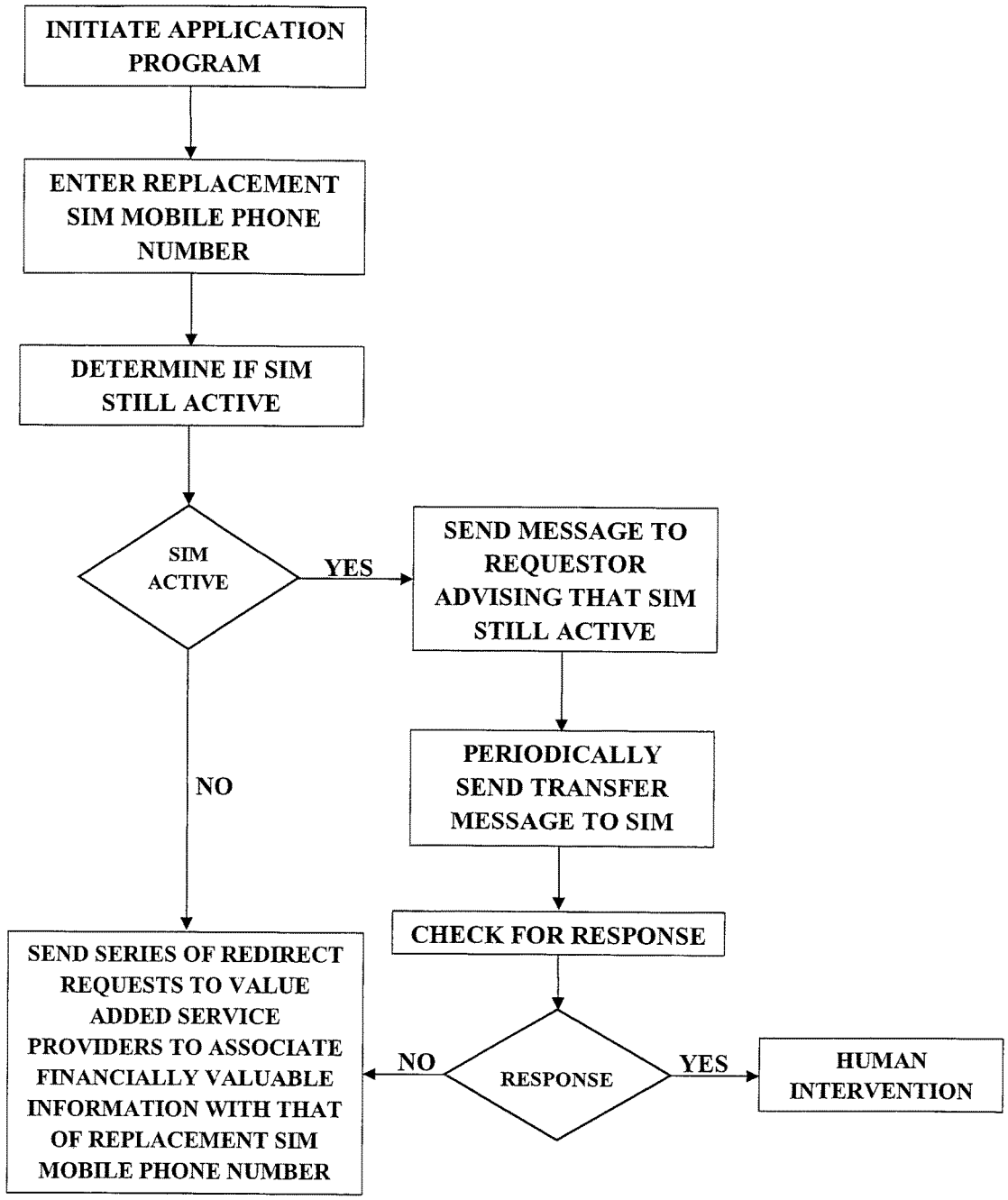
FIG. 3 is a second flow chart of a second aspect of the method of the first embodiment of the invention.
Figure 4:
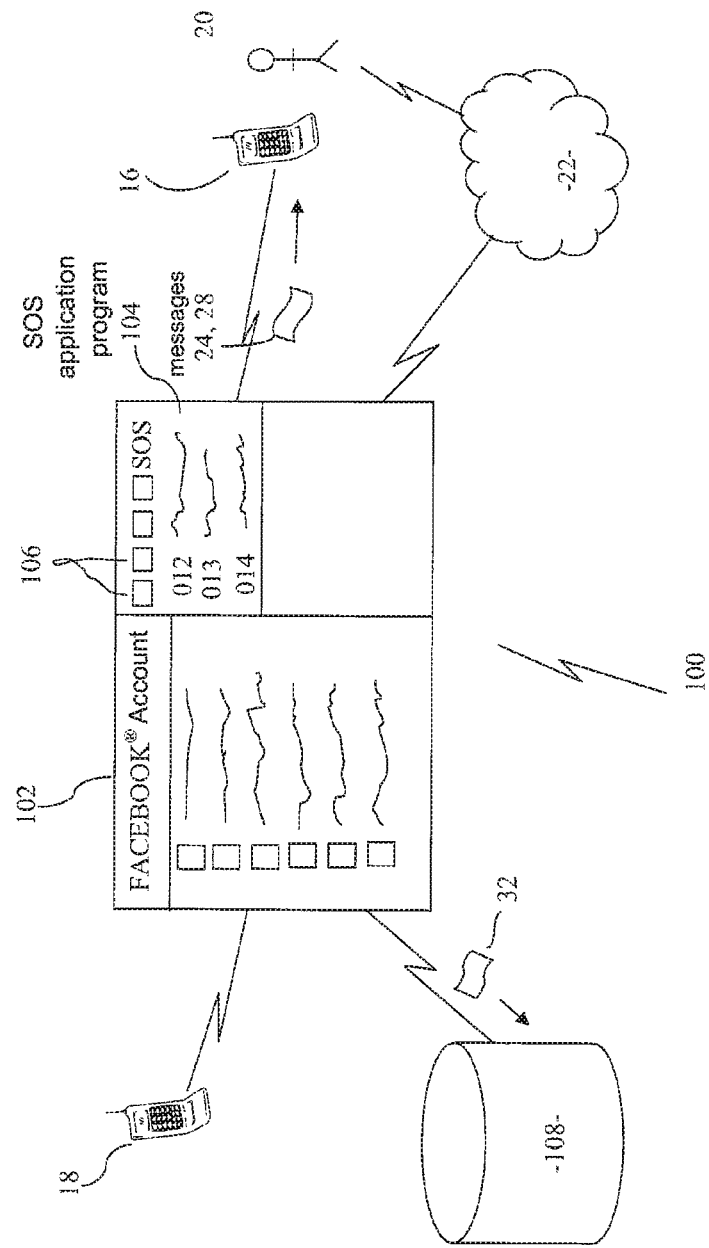
FIG. 4 is a schematic representation of a second embodiment of the invention.

A flowchart of the method underlying the system 10 of this first embodiment is shown in FIGS. 2 and 3.

In accordance with a second aspect of the invention, where like numerals reference like parts, there is a system 100 of associating financially valuable information with at least one unregistered pre-paid mobile phone number. The system 10 comprises:
- a Facebook® account 102;
- an SOS application program 104;
- a pre-paid SIM 16 for a mobile phone; and
- a replacement SIM 18 for a mobile phone.

The SOS application program 104 is an application designed to work with the applicant's SOS™ VAS 108 as discussed further above.

The SOS application program 104 in this embodiment is an integrated component of Facebook's user interface. The SOS application program 104 can therefore be initiated by any means available to integrated applications through a standard Facebook® user interface. In this respect, it should be appreciated by the person skilled in the art that the applicant has no control over the Facebook® user interface and this user interface is known to change over time. Hence the means by which the SOS application program 14 may be initiated may also change over time.

The interaction of these components of the system 100 will now be described in the context of the most common use for the invention.

The user 20 logs into their Facebook® account 102 in the prevailing manner prescribed by Facebook®.

As part of the Facebook® user interface, the SOS application program 104 operates to display to the user 20 at least the following information:
 a series of command icons 106;
 the mobile phone number(s) the user 20 has registered with the SOS™ VAS 108;
 the credit lines made available to the user 20 through the SOS™ VAS 108; AND
 how much of these credit lines have been used.

In this example, as the user 20 has not yet registered a mobile phone number with the SOS™ VAS 108, the user 20 activates the appropriate command icon 106 to do so. Once activated, the SOS application program 104 prompts the user 20 to enter a mobile phone number. At the same time, the application program 104 automatically extracts relevant details of the user's Facebook® account 102.

The user 20 then enters in the mobile phone number associated with their pre-paid SIM 16.

The SOS application program 104 then generates a time-limited confirmation code and stores the confirmation code in memory. At the same time a timer is established to countdown the time until the confirmation code expires.

The SOS application program 104 then operates to send a communication message 24 to the pre-paid SIM 16 as identified by the entered mobile phone number. The body of the communication message 24 sets out the confirmation code.

The user 20 is then prompted by the SOS application program 104 to enter the confirmation code contained in the body of the communication message 24 sent to the pre-paid SIM 16. Once the confirmation code has been entered by the user 20, the SOS application program 104 verifies that it is correct.

Verification comprises two checks. The first check sees the confirmation code as entered by the user 20 compared with the confirmation code as stored in memory. The second check is to see that the timer countdown has not reached 0. If both checks are passed, then the confirmation code is considered to be verified.

Once verified, the SOS application program 104 operates to update the information displayed to the user 20 as referred to above, i.e. the registered mobile phone number and details of the initial credit lines are now displayed to the user 20.

If the user 20 thereafter loses the pre-paid SIM 16, or has it stolen or damaged, they then simply access their Facebook® account and initiate the "transfer" command icon 106 of the SOS application program 104.

Following initiation of the "transfer" command, the SOS application program 104 asks the user 20 to enter in details of the mobile phone number associated with the replacement SIM 18. The user 20 then enters in this new mobile phone number.

If the user 20 has recorded more than one mobile phone number with the SOS™ VAS 108 by way of the SOS application program 104, the user 20 is also asked for details of the mobile phone number of the SIM 16 being replaced by the replacement SIM 18. If the user 20 has only one mobile phone number recorded with the SOS™ VAS 108 then it is assumed that it is the SIM associated with this number that is being replaced by the replacement SIM 18.

In either case, following identification of the SIM 16 to be replaced and being provided with the mobile phone number of the replacement. SIM 18, the SOS application program 104 operates to verify authorisation of the transfer using the same verification process as has already been described for this embodiment—the verification process being targeted at the replacement SIM 18.

Following this "transfer" verification, the SOS application program 104 sends a redirect request 32 to the SOS™ VAS 108. The redirect request 32 instructs the SOS VAS 108 to transfer details of all financially valuable information associated with the mobile phone number of the pre-paid SIM 16 to the mobile phone number of the replacement SIM 18. Thus, following the redirect request 32, the financially valuable information recorded by SOS VAS 108 will be associated only with the user's Facebook® account 102 (as identified by the information automatically extracted by the application program 104 as described above) and the mobile phone number of the replacement SIM 18.

This process can then be repeated each time the user 20 in some way loses control of one or more of their SIMs.

Figure 5:
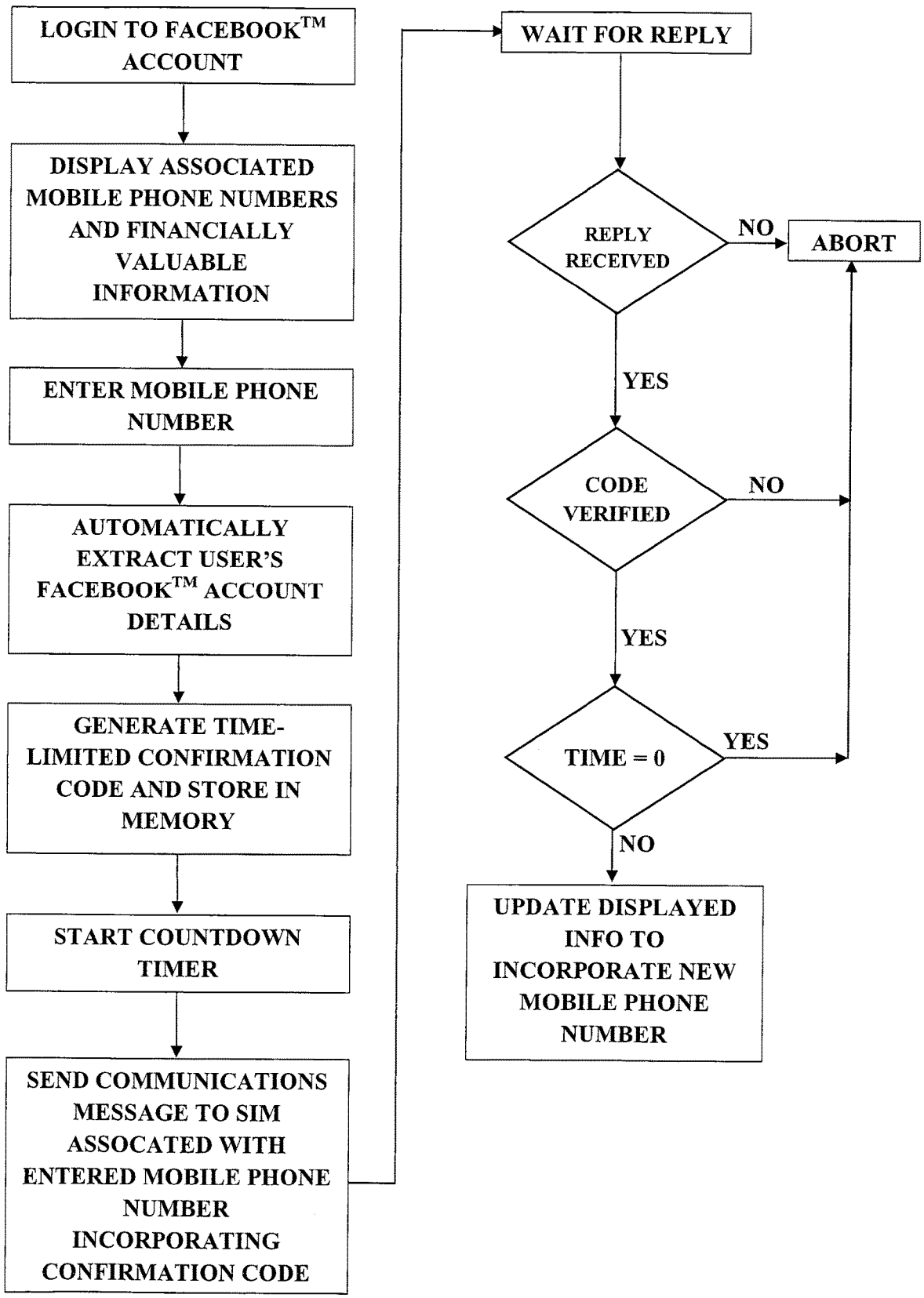
FIG. 5 is a flowchart of one aspect of the method of the second embodiment of the invention.
Figure 6:
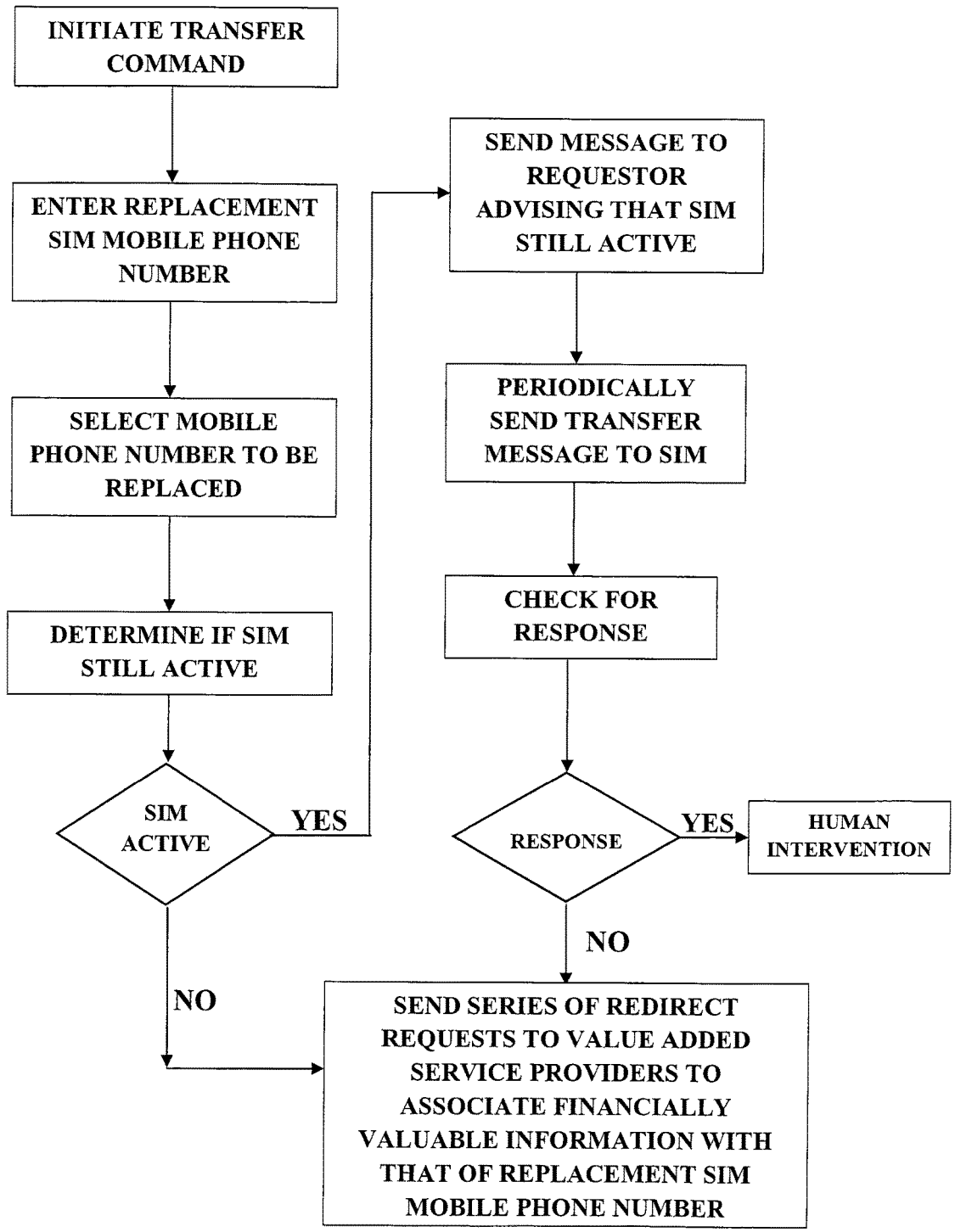
FIG. 6 is a flowchart of a second aspect of the method of the second embodiment of the invention.
Figure 7:
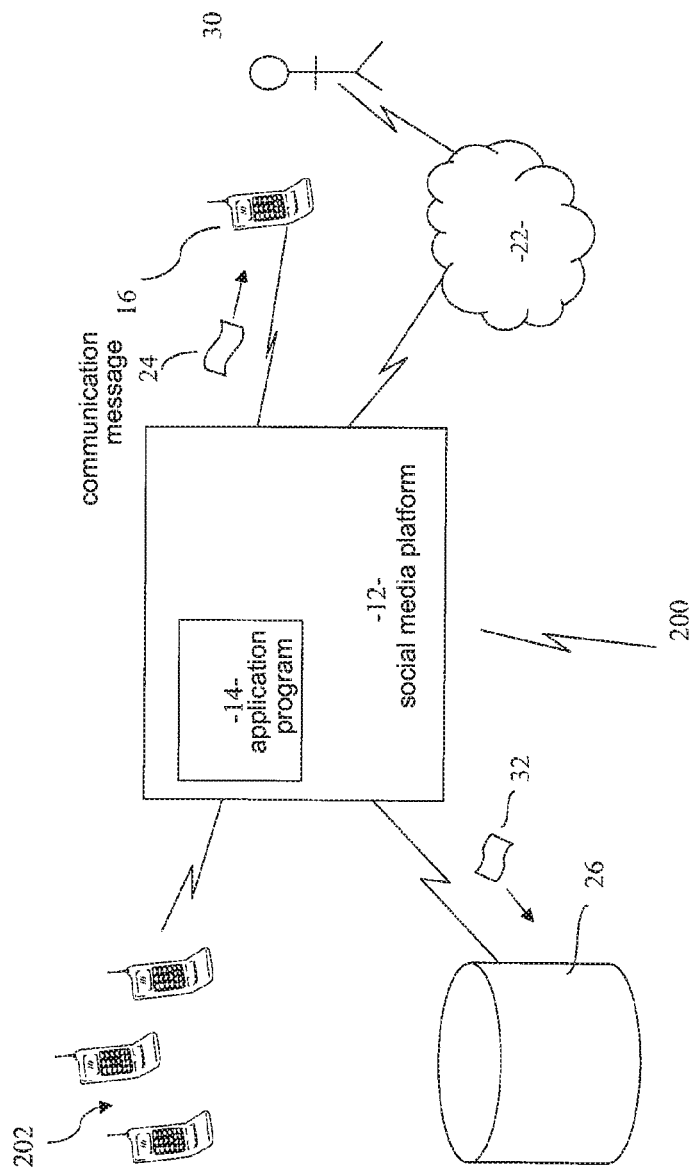
FIG. 7 is a schematic representation of a third embodiment of the invention.

A flowchart of the method underlying the system 100 of this second embodiment is shown in FIGS. 5 and 6.

In accordance with a third embodiment of the invention, where like numerals reference like parts, there is a system 200 of associating financially valuable information with at least one unregistered pre-paid mobile phone number. The system 200 comprises:
 a social media platform 12;
 an application program 14;
 a pre-paid SIM 16;
 a replacement SIM 18; and
 at least one additional SIM 202.

The social media platform 12 is accessible by the Internet 22. In this embodiment, the social media platform 12 requires each user 20 to provide particulars that assist in identifying the user 20, such as their legal name.

The application program 14 in this embodiment is a separate executable program adapted to work in conjunction with the social media platform 12. The application program 14 can be initiated through an icon displayed via the user interface of the social media platform 12.

The at least one additional SIM 202 can be installed on any form of communications device. However, in this embodiment, it is anticipated that the additional SIM 202 will be a post-paid SIM active on a mobile phone used by the user 20 for business purposes. The user 20 therefore uses the pre-paid SIM 16 for personal purposes.

The interaction of these components of the system 200 will now be described in the context of the most common use for the invention.

The user 20 downloads the application program 14 from a website 22. Once downloaded, the application program 14 is executed. The user 20 then logs into their account with the social media platform 12 in the manner prescribed by the social media platform 12.

Once the user's 20 account with the social media platform 12 has been accessed the user 20 initiates the application program 14 by way of the icon displayed via the user interface. Following initiation, the application program 14 prompts the user 20 to enter a first mobile phone number.

The user 20 then enters in the mobile phone number associated with their pre-paid SIM 16 as the first mobile phone number. At the same time, the application program 14 automatically extracts relevant details of the user's account with the social network platform 12.

The application program 14 then generates a time-limited confirmation code and stores the confirmation code in memory. At the same time a timer is established to countdown the time until the confirmation code expires.

The application program 14 then operates to send a communication message 24 to the mobile phone in which the pre-paid SIM 16 is active as identified by the entered first mobile phone number. The body of the communication message 24 sets out the confirmation code.

The user 20 is then prompted by the application program 14 to enter the confirmation code contained in the body of the communication message 24 sent to the mobile phone in which the pre-paid SIM 16 is active. Once the confirmation code has been entered by the user 20, the application program 14 verifies that it is correct.

Verification comprises two checks. The first check sees the confirmation code as entered by the user 20 compared with the confirmation code as stored in memory. The second check is to see that the timer countdown has not reached 0. If both checks are passed, then the confirmation code is considered to be verified.

Once verified, the application program 14 queries whether there are any further mobile phone numbers (i.e. SIMs) to be associated with the user's 20 social network account. If the user 20 responds in the affirmative the application repeats the above process to record and verify the additional phone numbers.

For the sake of this example, the user 20 indicates that there is one more phone number to be associated with their social network account. This additional phone number is the mobile phone number associated with their additional SIM 202.

Following confirmation from the user 20 that there are no further phone numbers to be associated with their social media account, any financially valuable information associated with any of the recorded mobile phone numbers is obtained from each participating VAS 26. In this embodiment, this financial valuable information is collated and where financially valuable information of the same type is recorded in relation to two or more of the recorded mobile phone numbers, to the extent that such financial information is mutually exclusive, the application program 14 collates only that financial information most beneficial to the user 20. As a result, the financial information recorded in relation to each associated mobile phone number is now shared across all of the SIMs.

Following this initial registration of SIMs, the user 20 need only initiate the application program 14 on at least one of the following situations:
the user 20 acquires another SIM; OR
the user 20 loses, or has stolen or damaged, one or more of their SIMs 16, 202.

Operation of the application program 14 in the first situation described above operates initially in an identical manner to the process described above, except that the user 20 must first indicate that the reason for executing the application program 14 is for the purposes of adding a mobile phone number associated with a further additional SIM 202.

Once the above process has executed any financially valuable information associated with the mobile phone number for the further additional SIM 202 is included as part of the collated financially valuable information for all recorded mobile phone numbers. Furthermore, this collated financially valuable information is then recorded in association with the mobile phone number for the further additional SIM 202 in place of any already associated financially valuable information.

By contrast, operation of the application program 14 in the second situation described above sees the user 20 first indicate that the reason for executing the application program 14 is for the purposes of replacing a lost, stolen or damaged SIM. Once this indication is made, the application program 14 asks the user 20 to enter in details of the mobile phone number associated with the replacement SIM 18. The user 20 then enters in this new mobile phone number.

If the user 20 has recorded more than one mobile phone number with the application program 14, the user 20 is also asked for details of the mobile phone number of the SIM 16 to be replaced by the replacement SIM 18. If the user 20 has only one mobile phone number recorded with the application program 14 then it is assumed that it is this SIM 16 that is being replaced by the replacement SIM 18.

In either case, following identification of the SIM 16 to be replaced and being provided with the mobile phone number of the replacement SIM, 18, the application program 14 operates to verify authorisation of the transfer using the same verification process as has already been described for this embodiment—the verification process being targeted at the replacement SIM 18.

In this embodiment, following this additional verification procedure, the application program 14 sends a series of redirect requests 32 to each participating VAS provider 26. Each redirect request 32 instructs a participating VAS provider 26 to transfer details of all financially valuable information associated with all of the user's 20 registered SIMs to the mobile phone number of the replacement SIM 18. Thus, following the redirect request, the financially valuable information recorded by each participating VAS provider 26 will be associated only with the social network account (as identified by the information automatically extracted by the application program 14 as described above) and the mobile phone number of the registered SIMs.

Figure 8:
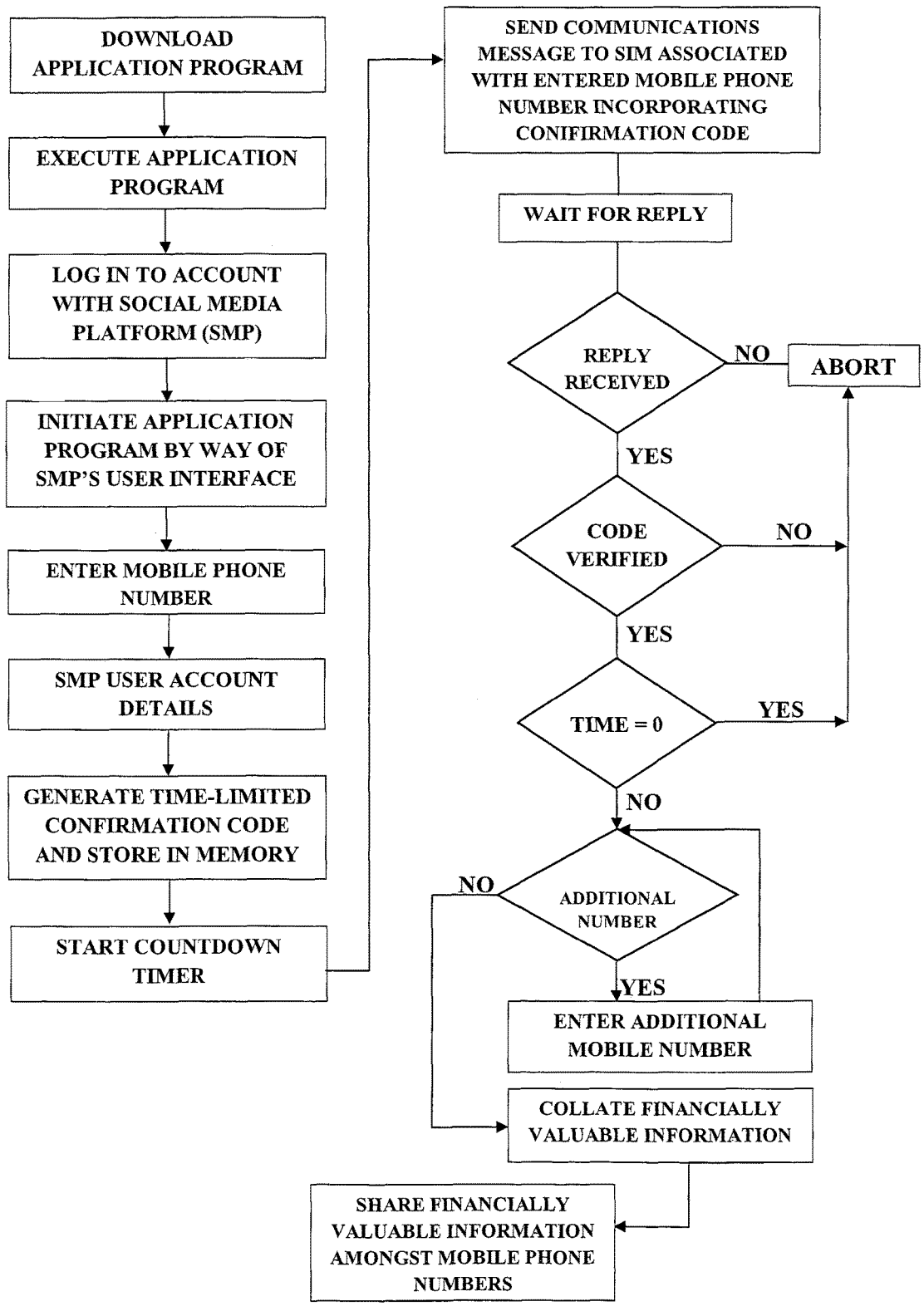
FIG. 8 is a flowchart of a first aspect of the method of the third embodiment of the invention.
Figure 9:
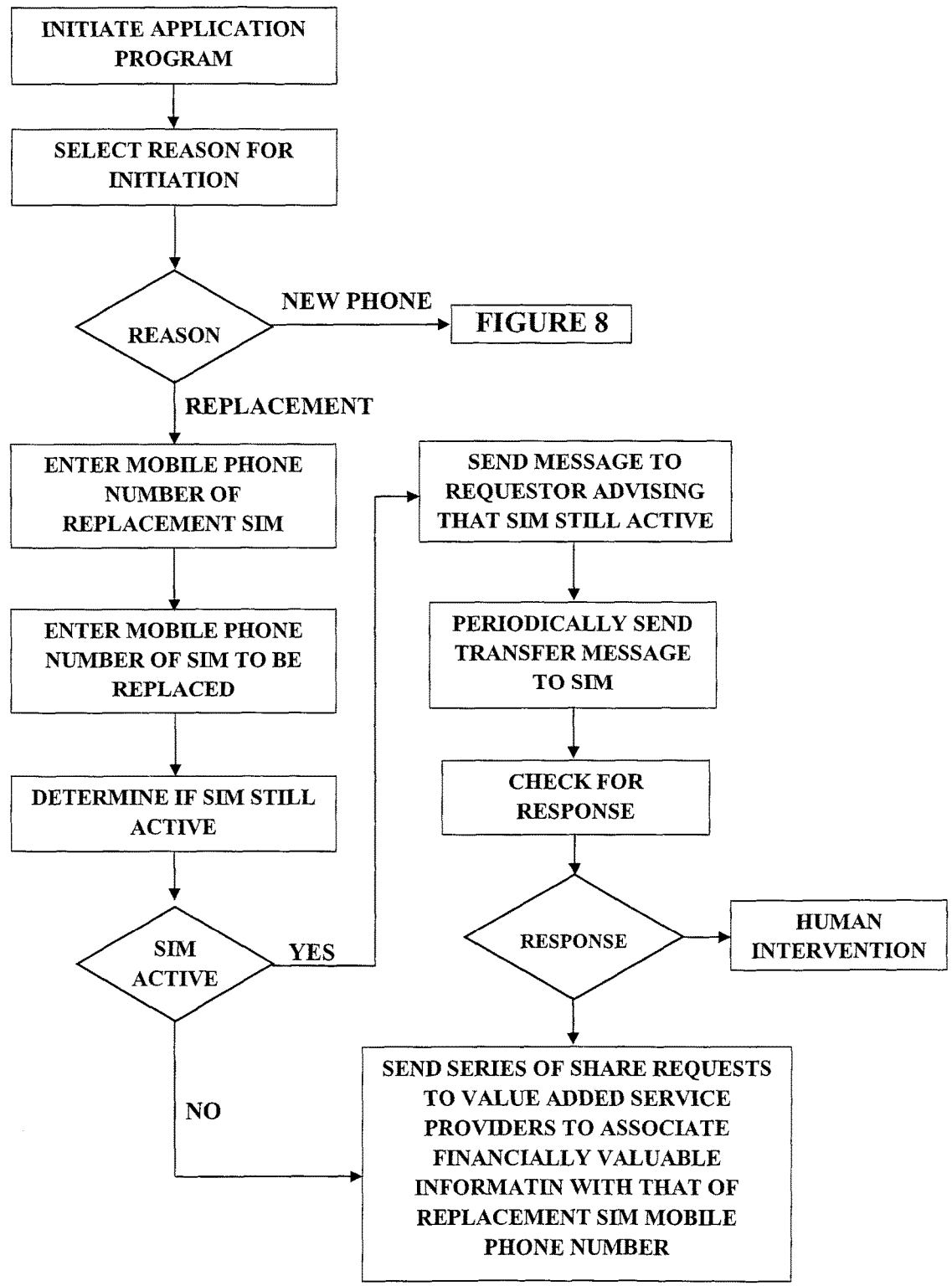
FIG. 9 is a flowchart of a second aspect of the method of the third embodiment of the invention.

A flowchart of the method underlying the system 200 of this third embodiment is shown in FIGS. 8 and 9.

While it should be appreciated that the invention is designed to solve a problem specific to the use of pre-paid mobile phones, the invention is not intended to be so limited. The invention may find use with post-paid mobile phone services where this approach provides an easier means for obtaining subscriber information than existing systems.

It should be appreciated by the person skilled in the art that the above invention is not limited to the embodiment described. In particular, the following modifications and improvements may be made without departing from the scope of the present invention:

While the invention could be implemented with reference to other external identifiers, there is a level of "investment" developed in a social network profile over time that makes it less likely to be deactivated or unused for extended time periods. Furthermore, use of other external identifiers such as e-mail addresses allow those seeking to engage in illicit activities the flexibility to do so by creating fake or misleading e-mail addresses.

Furthermore, while the embodiments have been described on the basis that the main association of a mobile phone number is with a SIM, it is recognised that both the means of association and the underlying technology may change over time. Hence the invention should not be considered limited to SIMs, but rather any device to which a mobile phone number may be associated. Similarly, while present systems employ mobile phone numbers as the core referring key against which financially valuable information is recorded, if this changes in the future the invention is to be considered to extend to the new form of association and the relevant technologies for implementing that association.

Other social networks with which the invention may be utilised include Twitter™, Google+™ and LinkedIn™.

The application program 14, 104 need not be a separate executable program. Instead, the application program 14, 104 may form part of the program code that controls the social network 12. Alternatively, the application program 14, 104 may be a collection of programs.

The application program 14, 104 need not be downloaded from an Internet site, but instead may be provided on either a computer readable medium that is bundled with the pre-paid mobile phone or as a pre-installed app in the solid state memory of the pre-paid mobile phone. Alternatively, the computer readable medium embodying the application program 14, 104 may be a separate product offered for sale alongside the pre-paid mobile phone.

The invention is not limited to any particular type of mobile phone 16. Similarly, the invention is not limited to mobile phones per se but can be used with any form or communications device that utilises a SIM, such as mobile broadband devices.

The application program 14, 104 need not integrate with the social network 12 by way of the user interface of the social network 12. In an alternative arrangement, the application program 14, 104 may have its own interface and obtains the necessary information from the user's social media account either through a series of queries or direct from the user. In this scenario, the application program 14, 104 may also do away with their own authentication requirements in favour of the user entering in the authentication information required by their designated social media account. This information can then be passed to the social media platform for authentication and, if authenticated by the social media platform, the user 20 will then also be considered authenticated for the purposes of the application program 14, 104.

If the SIM 16, 18 is being used in a phone of a type commonly referred to as a "smart phone" and the user 20 executes the application program 14, 104 and accesses their social media account by way of the "smart phone", then the step of querying the user 20 for their mobile phone number may be automated with this information being taken directly from the "smart phone".

The timer may be omitted or replaced with some other means of limiting the validity of the confirmation code. For example, the confirmation code may be deemed abandoned when the user 20 cancels execution of the application program 14, 104.

The communication message 24 may be sent using any mobile telecommunications based messaging protocol, such as SMS or MMS.

The application program 14, 104, may be modified to display information other than that described above. For instance, the application program 14, 104 may be modified to transition (either automatically or by user 20 intervention) through "pages" of information, each "page" displaying information in relation to one specific participating VAS provider 26.

In variations of the third embodiment, the collated financial information may undergo further processing. One example of further processing applied to the collated financial information may seek to normalise financially valuable information of the same type recorded in relation to two or more of the recorded phone numbers. This normalisation, operating in place of the processing described above where the best value is simply taken, may involve averaging discrete values on an independent or weighted basis.

Alternatively, in the third embodiment, where SIMs have financially valuable information recorded against them may be considered mutually exclusive, the mutually exclusive information may be collated and submitted to the VAS for re-assessment as a whole and the re-assessed financially valuable information then recorded against each recorded SIM.

In an application of the third embodiment, additional phone numbers can be added as "guarantor" numbers. In such a setup, the "guarantor" number will be charged for any VASs not otherwise paid for within a specified timeframe by the owner of the pre-paid mobile phone. As the "guarantor" number need not be relating to a SIM owned by the owner of the pre-paid SIM, this application of the invention has particularly usefulness in allowing a parent to "guarantee" the use of the phone by a child.

The application program 14, 104 may restrict the transfer functionality based on criteria associated with the social media account. For instance, transfer functionality may not be available for social media accounts that have been inactive for a set time frame or have only been in existence for a short period of time.

While the invention has been described with each VAS 26, 108 separately recording financially valuable information in relation to each mobile phone number, it should be appreciated that VASs 26, 108 may operate a common account against which financially valuable information may be recorded.

It should be further appreciated by the person skilled in the art that the above variations and modifications, not being mutually exclusive, can be combined to form yet further embodiments that fall within the scope of the present invention.

We claim:

1. A system of sharing, associating and transferring financially valuable information comprising:
    at least one originating communications device having an unregistered mobile phone number assigned thereto;
    at least one third party who holds financially valuable information recorded against a selected originating communications device from the at least one originating communications device;
    at least one additional communications device having a separate mobile phone number assigned thereto; and
    a memory, included in the at least one originating communications device, storing an application program which is operable to direct the third party to share the financially valuable information associated with the unregistered mobile phone number with the separate mobile phone number associated with each of the at least one additional communications device,
    operable to combine the financially valuable information associated with the unregistered mobile phone number and any financially valuable information associated with the separate mobile phone number associated with each of the at least one additional communications device and operable to associate the combined financially valuable information with both mobile phone numbers, wherein the application program is further operable to identify most favorable mutually exclusive financially valuable information from the financially valuable information associated with the unregistered mobile phone number and the financially valuable information associated with the separate mobile phone number, and the operability to combine involves a collation of the identified most favorable mutually exclusive financial information and all non-mutually exclusive financial information associated with either the unregistered mobile phone number or the separate mobile phone number.

2. The system of sharing, associating and transferring financially valuable information according to claim 1, wherein any charges applied by the at least one third party against the mobile phone number of the originating communications device, if not paid within a specified timeframe, are applied against the separate mobile phone number of the at least one additional communications device.

3. The system of sharing, associating and transferring financially valuable information according to claim 1, wherein to the extent that the financially valuable information associated with the unregistered mobile phone number of the originating communications device is mutually exclusive to the financially valuable information associated with the separate mobile phone number of the additional communications device, the application program operates to either include in the combined financially valuable information the most favourable elements of the separate sets of financially valuable information or to aggregate those elements of the separate financially valuable information and include the aggregated elements in the combined financially valuable information.

4. The system of sharing, associating and transferring financially valuable information according to claim 1, further comprising
an external identifier; and
wherein on execution of the application program, the application program automatically obtains the external identifier and operates to direct the at least one third party who holds the financially valuable information recorded against at least one of the unregistered mobile phone numbers allocated to the at least one originating communications device to associate such financially valuable information with the external identifier.

5. The system of sharing, associating and transferring financially valuable information according to claim 4, wherein the external identifier is either a user account with a social media platform or an e-mail address.

6. The system of sharing, associating and transferring financially valuable information according to claim 5, wherein the social media platform is one of the following: Twitter; Facebook; Google+; LinkedIn.

7. The system of sharing, associating and transferring financially valuable information according to claim 5, wherein the application program is integrated with at least a user interface of the social media platform.

8. The system of sharing, associating and transferring financially valuable information according to claim 7, wherein the external identifier is either the user account with the social media platform or an e-mail address, wherein the application program operates to show, by way of the user interface of the social media platform, either details of each of the at least one originating communications device associated with the user account or details of the financially valuable information associated with the user account.

9. The system of sharing, associating and transferring financially valuable information according to claim 8, wherein the application program operates to show, by way of the user interface of the social media platform, details of the financially valuable information associated with each of the at least one originating communications device.

10. The system of sharing, associating and transferring financially valuable information according to claim 9, wherein the financially valuable information displayed is grouped according to the third party whom has generated that information.

11. The system of sharing, associating and transferring financially valuable information according to claim 4, wherein the application program initiates an authentication process and only directs the at least one third party who holds the financially valuable information to associate the financially valuable information with the external identifier following successful authentication.

12. The system of sharing, associating and transferring financially valuable information according to claim 11, wherein the authentication process includes responding within a set time period with a code sent by communications message to at least one of the at least one unregistered mobile phone number.

13. The system of sharing, associating and transferring financially valuable information according to claim 4, wherein either the at least one originating communications device is a pre-paid mobile phone or at least one of the at least one third party is a value added service provider or the at least one third party is also the provider of the application program.

14. The system of sharing, associating and transferring financially valuable information according to claim 1, further comprising:
at least one replacement communications device having a separate mobile phone number assigned thereto,
wherein the application program is operable to direct the at least one third party to transfer the financially valuable information associated with the unregistered mobile phone number assigned to the selected originating communications device to the separate mobile phone number associated with the replacement communications device.

15. The system of sharing, associating and transferring financially valuable information according to claim 14, wherein the application program is further operable to check if the mobile phone number assigned to the selected originating communications device is still active and, if still active, to send a message to the mobile phone number assigned to the selected originating communications device advising that a request has been made to transfer the financially valuable information to the replacement communications device.

16. The system of sharing, associating and transferring financially valuable information according to claim 15, wherein if the mobile phone number assigned to the selected originating communications device is still active, the application program is further operable to periodically send communication messages to the selected originating communications device advising that a request has been made to transfer the financially valuable information to the replacement communications device until expiry of a preset time period.

17. The system of sharing, associating and transferring financially valuable information according to claim 16, wherein the application program only proceeds to issue the direction to the at least one third party to transfer the financially valuable information if the preset time period has expired and a user who owns or is in possession of the selected originating communications device does not record an objection to the transfer with the application program.

18. The system of sharing, associating and transferring financially valuable information according to claim 17, wherein the user records an objection to the transfer with the application program by way of a reply message to the communication messages advising that a request has been made to transfer the financially valuable information to the replacement communications device.

19. The system of sharing, associating and transferring financially valuable information according to claim 14, as dependent on a system of associating financially valuable information recorded against any unregistered mobile phone number with an external identifier that is either a user account with a social media platform or an e-mail address, wherein the application program only proceeds to issue the direction to the at least one third party to transfer the financially valuable information if the user account with the social media platform meets predetermined criteria.

20. The system of sharing, associating and transferring financially valuable information according to claim 19, wherein the predetermined criteria is at least one of the following: the user account has been active within a set time frame; the user account has been in existence for at least a predetermined time period.

21. A method of sharing, associating and transferring financially valuable information in at least one originating communications device which stores an application program in a memory, comprising the steps of:
receiving details of an unregistered mobile phone number having associated financially valuable information;
receiving details of a separate mobile phone number associated with each of at least one additional communications device;
directing at least one third party who holds financially valuable information recorded against a selected originating communications device from the at least one originating communications device having the unregistered mobile phone number to share the financially valuable information associated with the unregistered mobile phone number with the separate mobile phone number;
combining the financially valuable information associated with the unregistered mobile phone number and any financially valuable information associated with the separate mobile phone number associated with each of the at least one additional communications device;
associating the combined financially valuable information with both mobile phone numbers; and
identifying most favorable mutually exclusive financially valuable information from the financially valuable information associated with the unregistered mobile phone number and the financially valuable information associated with the separate mobile phone number,
wherein the step of combining involves a collation of the identified most favorable mutually exclusive financial information and all non-mutually exclusive financial information associated with either the unregistered mobile phone number or the separate mobile phone number.

22. The method of sharing, associating and transferring financially valuable information according to claim 21, further comprising the step of applying charges of the third party made against the unregistered mobile phone number against the separate mobile phone number if not paid within a specified timeframe.

23. The method of sharing, associating and transferring financially valuable information according to claim 21, further comprising the steps of:
to the extent possible, aggregating the most favourable mutually exclusive financially valuable information from the financially valuable information associated with the unregistered mobile phone number and the financially valuable information associated with the separate mobile phone number; and
wherein the step of combining involves a collation of the aggregated most favourable mutually exclusive financial information and all non-mutually exclusive financial information associated with either the unregistered mobile phone number or the separate mobile phone number.

24. The method of sharing, associating and transferring financially valuable information according to claim 21, further comprising the steps of:
automatically obtaining an external identifier; and
directing the at least one third party who holds the financially valuable information recorded against the at least one unregistered mobile phone number assigned to the originating communications device to associate such financially valuable information with the external identifier.

25. The method of sharing, associating and transferring financially valuable information according to claim 24, wherein when the external identifier is a user account with a social media platform, the method further comprising the step of displaying details of the originating communications device associated within the external identifier by way of the social media platform's user interface.

26. The method of sharing, associating and transferring financially valuable information according to claim 25, further comprising the step of displaying details of the financially valuable information associated with the originating communications device by way of the social media platform's user interface.

27. The method of sharing, associating and transferring financially valuable information according to claim 24, wherein when the external identifier is a user account with a social media platform, the method further comprising the step of displaying details of the financially valuable information associated with the user account by way of the social media platform's user interface.

28. The method of sharing, associating and transferring financially valuable information according to claim 26, the method further comprising the step of grouping the financially valuable information according to the third party whom has generated that information.

29. The method of sharing, associating and transferring financially valuable information according to claim 24, further comprising the step of initiating an authentication process and only performing the step of directing the at least one third party who holds the financially valuable information recorded against the unregistered mobile phone number assigned to the originating communications device to associate such financially valuable information with the external identifier on successful completion of the authentication process.

30. The method of sharing, associating and transferring financially valuable information according to claim 21, further comprising the step of:
 directing the at least one third party to transfer the financially valuable information associated with the unregistered mobile phone number to the separate mobile phone number.

31. The method of sharing, associating and transferring financially valuable information according to claim 30, further comprising the steps of:
 checking if the unregistered mobile phone number is still active; and
 if the unregistered mobile phone number is still active, sending a message to the unregistered mobile phone number advising that a request has been made to transfer the financially valuable information to another mobile phone number.

32. The method of sharing, associating and transferring financially valuable information according to claim 31, further comprising the step of periodically sending further messages to the unregistered mobile phone number until expiry of a preset time period.

33. The method of sharing, associating and transferring financially valuable information according to claim 32, further comprising the steps of:
 waiting during the preset time period for an objection message from the unregistered mobile phone number; and
 only directing the at least one third party to transfer the financially valuable information associated with the unregistered mobile phone number to the separate mobile phone number if an objection message is not received from the unregistered mobile phone number before the expiry of the preset time period.

34. The method of sharing, associating and transferring financially valuable information according to claim 30 further comprising a condition of only directing the at least one third party to transfer the financially valuable information associated with the unregistered mobile phone number to the separate mobile phone number if the financially valuable information is also associated with a user account with a social media platform and that user account meets predetermined criteria.

35. The method of sharing, associating and transferring financially valuable information according to claim 34, wherein the predetermined criteria is at least one of the following: the user account has been active within a set time frame; the user account has been in existence for at least a predetermined time period.

36. A non-transitory computer readable medium containing executable software instructions of sharing, associating and transferring financially valuable information, when executed on an appropriate processing device, performs a method comprising the steps of:
 receiving details of an unregistered mobile phone number having associated financially valuable information;
 receiving details of a separate mobile phone number associated with each of at least one additional communications device;
 directing at least one third party who holds financially valuable information recorded against a selected originating communications device from at least one originating communications device having the unregistered mobile phone number to share the financially valuable information associated with the unregistered mobile phone number with the separate mobile phone number;
 combining the financially valuable information associated with the unregistered mobile phone number and any financially valuable information associated with the separate mobile phone number associated with each of the at least one additional communications device;
 associating the combined financially valuable information with both mobile phone numbers; and
 identifying most favorable mutually exclusive financially valuable information from the financially valuable information associated with the unregistered mobile phone number and the financially valuable information associated with the separate mobile phone number,
 wherein the step of combining involves a collation of the identified most favorable mutually exclusive financial information and all non-mutually exclusive financial information associated with either the unregistered mobile phone number or the separate mobile phone number.

37. The non-transitory computer readable medium containing executable software instructions of sharing, associating and transferring financially valuable information according to claim 36, performs a method further comprising the step of: applying charges of the third party made against the unregistered mobile phone number against the separate mobile phone number if not paid within a specified timeframe.

38. The non-transitory computer readable medium containing executable software instructions of sharing, associating and transferring financially valuable information according to claim 36, performs a method further comprising the steps of:
 to the extent possible, aggregating the most favourable mutually exclusive financially valuable information from the financially valuable information associated with the unregistered mobile phone number and the financially valuable information associated with the separate mobile phone number; and
 wherein the step of combining involves a collation of the aggregated most favourable mutually exclusive financial information and all non-mutually exclusive financial information associated with either the unregistered mobile phone number or the separate mobile phone number.

39. The non-transitory computer readable medium containing executable software instructions of sharing, associating and transferring financially valuable information according to claim 36, performs a method further comprising the steps of:
 automatically obtaining an external identifier; and
 directing the at least one third party who holds the financially valuable information recorded against the at least one unregistered mobile phone number assigned to the originating communications device to associate such financially valuable information with the external identifier.

40. The non-transitory computer readable medium containing executable software instructions of sharing, associating and transferring financially valuable information according to claim 39, wherein when the external identifier is a user account with a social media platform, the non-transitory computer readable medium performs a method further comprising the step of displaying either details of the originating communications device associated within the external identifier by way of the social media platform's user interface or details of the financially valuable information associated with the user account by way of the social media platform's user interface.

41. The non-transitory computer readable medium containing executable software instructions of sharing, associating and transferring financially valuable information according to claim 40, performs a method further comprising the step of displaying details of the financially valuable information associated with the originating communications device by way of the social media platform's user interface.

42. The non-transitory computer readable medium containing executable software instructions of sharing, associating and transferring financially valuable information according to claim 41, performs a method further comprising the step of grouping the financially valuable information according to the third party whom has generated that information.

43. The non-transitory computer readable medium containing executable software instructions of sharing, associating and transferring financially valuable information according to claim 39, performs a method further comprising the step of initiating an authentication process and only operates to direct the at least one third party who holds the financially valuable information recorded against the unregistered mobile phone number assigned to the originating communications device to associate such financially valuable information with the external identifier on successful completion of the authentication process.

44. The non-transitory computer readable medium containing executable software instructions of sharing, associating and transferring financially valuable information according to claim 36, performs a method further comprising the step of:
    directing the at least one third party to transfer the financially valuable information associated with the unregistered mobile phone number to the separate mobile phone number.

45. The non-transitory computer readable medium containing executable software instructions of sharing, associating and transferring financially valuable information according to claim 44, performs a method further comprising the steps of:
    checking if the unregistered mobile phone number is still active; and
    if the unregistered mobile phone number is still active, sending a message to the unregistered mobile phone number advising that a request has been made to transfer the financially valuable information to another mobile phone number.

46. The non-transitory computer readable medium containing executable software instructions of sharing, associating and transferring financially valuable information according to claim 45, performs a method further comprising the step of periodically sending further messages to the unregistered mobile phone number until expiry of a preset time period.

47. The non-transitory computer readable medium containing executable software instructions of sharing, associating and transferring financially valuable information according to claim 46, performs a method further comprising the steps of:
    waiting during the preset time period for an objection message from the unregistered mobile phone number; and
    only directing the at least one third party to transfer the financially valuable information associated with the unregistered mobile phone number to the separate mobile phone number if an objection message is not received from the unregistered mobile phone number at the expiry of the preset time period.

48. The non-transitory computer readable medium containing executable software instructions of sharing, associating and transferring financially valuable information according to claim 44, performs a method further comprising the step of only directing the at least one third party to transfer the financially valuable information associated with the unregistered mobile phone number to the separate mobile phone number if the financially valuable information is also associated with a user account with a social media platform and that user account meets predetermined criteria.

49. The non-transitory computer readable medium containing executable software instructions of sharing, associating and transferring financially valuable information according to claim 48, wherein the predetermined criteria is at least one of the following: the user account has been active within a set time frame; the user account has been in existence for at least a predetermined time period.

* * * * *